(12) United States Patent
Cao et al.

(10) Patent No.: US 10,121,605 B2
(45) Date of Patent: Nov. 6, 2018

(54) WIDE OPERATING TEMPERATURE RANGE ELECTROLYTES FOR LITHIUM-ION CAPACITORS ACHIEVING HIGH PERFORMANCE

(71) Applicant: GENERAL CAPACITOR, LLC, Tallahassee, FL (US)

(72) Inventors: Wanjun Cao, Tallahassee, FL (US); Harry Chen, Tallahassee, FL (US); Jian-ping (Jim) Zheng, Tallahassee, FL (US); Daniel L. Adams, Tallahassee, FL (US)

(73) Assignee: GENERAL CAPACITOR, LLC, Tallahassee, FL (US)

( * ) Notice: Subject to any disclaimer, the term of this patent is extended or adjusted under 35 U.S.C. 154(b) by 154 days.

(21) Appl. No.: 14/968,538

(22) Filed: Dec. 14, 2015

(65) Prior Publication Data

US 2016/0307706 A1 Oct. 20, 2016

Related U.S. Application Data

(60) Provisional application No. 62/091,681, filed on Dec. 15, 2014.

(51) Int. Cl.
*H01G 11/56* (2013.01)
*H01G 11/50* (2013.01)
(Continued)

(52) U.S. Cl.
CPC ............ *H01G 11/50* (2013.01); *H01G 11/06* (2013.01); *H01G 11/56* (2013.01); *H01G 11/86* (2013.01); *H01G 11/60* (2013.01); *Y02E 60/13* (2013.01)

(58) Field of Classification Search
CPC ........ H01G 9/028; H01G 9/035; H01G 9/032; H01G 9/025; H01G 11/54; H01G 11/56; H01G 11/58
See application file for complete search history.

(56) References Cited

U.S. PATENT DOCUMENTS

| 2010/0221587 A1* | 9/2010 | Yanagita | ............... | H01G 9/016 |
| | | | | 429/94 |
| 2012/0007560 A1* | 1/2012 | Smart | ................... | H01M 6/164 |
| | | | | 320/127 |

\* cited by examiner

*Primary Examiner* — Nguyen Ha
(74) *Attorney, Agent, or Firm* — Richard D. Clarke

(57) ABSTRACT

The present invention provides for two types of wide operating temperature range electrolyte formulations that contain methyl butyrate (MB) and additives have been investigated and compared in Lithium-ion capacitors (LICs), which were consisted of hard carbon (HC)/stabilized lithium metal powder (SLMP) anodes and activated carbon (AC) cathodes. The electrolyte L1 that was 1M $LiPF_6$ in ethylene carbonate (EC)+ethyl methyl carbonate (EMC)+MB (20:20:60 v/v %)+0.1M lithium bis(oxalato)borate (LiBOB) and electrolyte L2 that was 1M $LiPF_6$ in EC+EMC+MB (20:20:60 v/v %)+0.1M lithium difluoro(oxalato)borate (LiDFOB) enabled the LICs to discharge at the temperature as low as −40° C., which the conventional electrolyte LP30 that was 1 M $LiPF_6$ in EC+dimethyl carbonate (DMC) (50:50 w/w %) could not achieve. At the low temperature of −40° C., L2 held more than 64% of the discharge capacity at 30° C., while the L1 only had the discharge capacity retention of 30%. In addition, L2 proved to achieve better cycling performance compared to L1. After 10,000 cycles, the capacity retention of L1 and L2 were about 86.6% and 84.7%, which demonstrated the stable cycling performance for electrolyte L1 and L2. In summary, L2 was the most suitable electrolyte for the LICs energy storage devices (Continued)

which would be applied in the temperature as low as −40° C.

10 Claims, 18 Drawing Sheets

(51) Int. Cl.
*H01G 11/86* (2013.01)
*H01G 11/06* (2013.01)
*H01G 11/60* (2013.01)

WIDE OPERATING TEMPERATURE RANGE ELECTROLYTES FOR LITHIUM-ION CAPACITORS ACHIEVING HIGH PERFORMANCE

FIELD OF THE INVENTION

The present invention relates to lithium-ion capacitor (LIC) laminate cells that include positive electrodes, negative electrodes and organic solvent electrolyte with lithium salt. More particularly, the present application provides an LIC electrolyte formulation L1 comprising 1M LiPF$_6$ in ethylene carbonate (EC)+ethyl methyl carbonate (EMC)+ methyl butyrate (MB) at a ratio of 20:20:60 v/v %, respectively, +0.1M lithium bis(oxalato)borate (LiBOB), and a second electrolyte formulation L2 that was 1M LiPF$_6$ in EC+EMC+MB at a ratio of 20:20:60 v/v %, respectively, +0.1M lithium difluoro(oxalato)borate (LiDFOB), which formulation enabled the LICs to discharge at the temperature as low as −40° C., achieve improved cycling performance and capacity retention after 10,000 cycles.

BACKGROUND OF THE INVENTION

Electrochemical (EC) capacitors have the properties of high power density, high reliability, high efficiency and a long lifetime. The applications areas of EC capacitors include trimming the blades of windmills as winds change and energy storage generated by solar panels, which are in the area of renewable energy. EC capacitors can be used in the energy storage in the area of transportation. When the electric buses run without power lines, the EC capacitors are quickly recharged whenever a bus is at any bus stop and fully charged in the terminus. This is the same in hybrid electric vehicles (HEVs) for using EC capacitors as the energy storage devices during regenerative braking. EC capacitors are being used in digital cameras to give a burst of power for flashes in the area of consumer electronics. EC capacitors can also be used for the short bursts of power needed in equipment designed for heavy lifting because they provide a longer operating life than the traditional lead acid batteries.

Numerous new applications of EC capacitors have been found in automotive and utility as energy storage components. Utilities have interest in EC capacitors as replacements for battery banks that are being used to buffer short-term outrages on the power grid. Probably the most pervasive application of EC capacitors as power components is starting to appear in the automobiles which are powered by the fuel cell. Some of these automobile are being manufactured by Honda Motor Company and also by Toyota, General Motors and others for lease to cities in the United States and elsewhere. EC capacitors are good at providing precise bursts of energy and also at receiving and storing energy bursts produced by regenerative braking.

However, regardless of the advantages and many applications of EC capacitors, the biggest challenge presented by EC capacitors is how to significantly increase the energy density which is now less than 10% of that in advanced rechargeable batteries. For a long period of time, a large amount of work has been done in understanding the relationship of the pore size to the ionic accessibility from the electrolyte and developing various pseudo-capacitance materials in order to maximize the charge storage capability[1-4]; however, there are limited studies on charge storage mechanisms such as the active role the electrolyte plays during the charge and discharge process: ion separation or ion shutter. In double-layer capacitors, the ionic concentration in the electrolyte increases and decreased during charge and discharge, respectively.

The energy density theory guide clearly shows that the energy densities for both double-layer capacitors and asymmetrical cells are mainly limited, by how many ions are available in the electrolyte or the salt concentration in the electrolyte[5-9], because the minimum amount of required ions in the electrolyte is equal to the maximum charge capacity of the electrode in a capacitor. In contrast, for lithium (Li)-ion batteries, the Li ions shutter between two electrodes and the concentration keeps a constant value during charge and discharge; therefore, a high energy density cell can be obtained.

From the theoretical and experimental studies, it has been concluded that the energy density for both conventional EC double-layer capacitors or asymmetrical cells must be much less than that of advanced batteries, due to the fundamental difference between these two systems, in which the EC double-layer capacitors and asymmetrical cells consume the salt in electrolyte during the charge process; but the advanced batteries do not consume salt in the electrolyte. In EC double-layer capacitors and asymmetrical cells, the minimum weight of the required electrolyte in the cell is even greater than the weight of both electrode materials; however; in advanced batteries, the ion concentration in the electrolyte remains constant during the entire charge and discharge process, and there is no net ion exchange between the electrode and the electrolyte.

In recent years considerable reseal[10-30] has been focused on the development of high energy density EC capacitors. Among all the energy storage systems that have been investigated and developed in the last few years, Lithium-ion Capacitors (LICs) have emerged to be one of the most promising, because LICs achieve higher energy density than conventional Electric Double-Layer Capacitors (EDLCs), and better power performance than Li-ion batteries (LIBs) as well being capable of long cycle life. LICs contain a pre-lithiated LIB anode electrode and an EDLC cathode electrode[7-9]. Previously, we have reported a LIC with activated carbon (AC) cathode and hard carbon (HC)/stabilized lithium metal powder (SLMP) anode electrodes with high energy density, high power density and long cycle life[31-36].

However, to the best of our knowledge, there are not adequate reports about the low temperature performance of the LICs that can be discharged at −40° C.; while the low and high temperature performance of LIBs has been investigated tremendously by some research group in the past few years. Zhang and Kang et al.[37-39] found the salt LiBOB and LiDFOB could be used as the additive to improve the low and high temperature performance of the LIBs; Smart et al.[40-42] has also developed and compared numerous wide operating temperature range electrolyte formulations for the LIBs.

Therefore, in order to develop higher performance LICs with wider working temperature, more research work is needed to develop wide temperature range electrolyte that can be used in LICs. In this patent application, the inventors wish to report two types of wide operating temperature electrolyte formulas that contain methyl butyrate (MB) and additives, and enable the LICs to discharge at the temperature as low as −40° C. The electrochemical performance of the LICs with all kinds of electrolyte at various temperatures from 70° C. to −40° C. is studied and compared in detail. The cycling performance of the wide operating temperature electrolyte is also included in this patent application.

In this respect, before explaining at least one embodiment of the invention in detail it is to be understood that the invention is not limited in its application to the details of chemistry, composition, and to the functionality of the formulations set forth in the following description or illustrated in the drawings. The invention is capable of other embodiments and of being practiced and carried out in various ways. In addition, it is to be understood that the phraseology and terminology employed herein are for the purpose of description and should not be considered to be, or regarded as limiting.

SUMMARY OF THE INVENTION

The principle advantage of the present invention is to provide a lithium-ion capacitor or (LIC) laminate cell electrolyte composition which has excellent high performance characteristics and specifications at wide operating temperatures.

Another advantage of this invention is to provide an LIC laminate cell electrolyte composition which has excellent high performance characteristics and specifications at wide operating temperatures, especially at very low temperatures.

Another advantage of this invention is to provide an LIC laminate cell electrolyte composition which has excellent high performance characteristics and specifications at wide operating temperatures, especially at very low temperatures down to −40° C.

Another advantage of this invention is to provide an LIC laminate cell including a positive electrode, a negative electrode and an organic solvent electrolytic solution with lithium salt as the electrolyte, wherein two types of wide operating temperature range electrolyte formulations exhibit high performance characteristics.

Another advantage of this invention is to provide electrolyte formulations that contain methyl butyrate (MB) and varying additives that have been investigated and compared in Lithium-ion capacitors (LICs), which LIC's consisted of hard carbon (HC)/stabilized lithium metal powder (SLMP) anodes and activated carbon (AC) cathodes.

Another advantage of this invention is to provide an electrolyte L1 that was 1M LiPF$_6$ in ethylene carbonate (EC)+ethyl methyl carbonate (EMC)+MB (20:20:60 v/v %)+0.1M lithium bis (oxalato) borate (LiBOB)), which enabled the LICs to discharge at the temperature as low as −40° C.

Another advantage of this invention is to provide an electrolyte L2 that was 1M LiPF$_6$ in EC+EMC+MB (20:20:60 v/v %)+0.1M Lithium difluoro (oxalato)borate (LiDFOB), which enabled the LICs to discharge at the temperature as low as −40° C.

Another advantage of this invention is to provide L1 and L2 electrolytes wherein at the low temperature of −40° C., L2 held more than 64% of the discharge capacity at 30° C., while the L1 electrolyte had the discharge capacity retention of 30%.

Another advantage of this invention is to provide L1 and L2 electrolytes wherein after 3500 cycles, the capacity retention of L2 was 96% while L1 had the capacity retention of 88%.

Another advantage of this invention is to provide an electrolyte L1 comprising 1M LiPF$_6$ in ethylene carbonate (EC)+ethyl methyl carbonate (EMC)+MB (20:20:60 v/v %)+0.1M lithium bis (oxalato) borate (LiBOB)

And yet another advantage of this invention is to provide and electrolyte L2 that was 1M LiPF$_6$ in EC+EMC+MB (20:20:60 v/v %)+0.1M lithium difluoro (oxalato)borate (LiDFOB), which enabled the LICs to discharge at extreme temperatures, as low as −40° C.

Extensive research efforts by the inventors of the present invention resulted in successfully presenting the following unexpected solution to the problem of creating a lithium-ion capacitor (LIC) laminate cell electrolyte composition which achieves high performance characteristics in its cycling ability, discharge capacity and capacity retention at wide operating temperatures, especially temperatures as low as −40° C.

The present invention may be summarized as follows: according to the LIC laminate cell of present invention, there is provided an LIC laminate cell including a positive electrode, a negative electrode and an organic solvent electrolytic solution with lithium salt as the electrolyte, wherein two types of wide operating temperature range electrolyte formulations that contain methyl butyrate (MB) and additives have been investigated and compared in Lithium-ion capacitors (LICs), which were consisted of hard carbon (HC)/stabilized lithium metal powder (SLMP) anodes and activated carbon (AC) cathodes.

The electrolyte L1 that was 1M LiPF$_6$ in ethylene carbonate (EC)+ethyl methyl carbonate (EMC)+MB (20:20:60 v/v %)+0.1M lithium his (oxalato) borate (LiBOB) and electrolyte L2 that was 1M LiPF$_6$ in EC+EMC+MB (20:20:60 v/v %)+0.1M lithium difluoro (oxalato)borate (LiDFOB) enabled the LICs to discharge at the temperature as low as −40° C., which the conventional electrolyte LP30 that was 1M LiPF$_6$ in EC+dimethyl carbonate (DMC) (50:50 w/w %) could not achieve. At the low temperature of −40° C., L2 held more than 64% of the discharge capacity at 30° C., while the L1 only had the discharge capacity retention of 30%.

In addition, L2 proved to achieve better cycling performance compared to L1. After 3500 cycles, the capacity retention of L2 was 96%; while L1 just had the capacity retention of 88%. In summary, L2 was the most suitable electrolyte for the LICs energy storage devices which would be applied in the temperature as low as −40° C.

According to the present invention, there is provided two types of wide operating temperature range electrolyte formulations that contain methyl butyrate (MB) and additives have been investigated and compared in Lithium-ion capacitors (LICs), which were consisted of hard carbon (HC)/stabilized lithium metal powder (SLMP) anodes and activated carbon (AC) cathodes. The electrolyte L1 that was 1M LiPF$_6$ in ethylene carbonate (EC)+ethyl methyl carbonate (EMC)+MB (20:20:60 v/v %)+0.1M lithium his (oxalato) borate (LiBOB) and electrolyte L2 that was 1M LiPF$_6$ in EC+EMC+MB (20:20:60 v/v %)+0.1M lithium difluoro (oxalato)borate (LiDFOB) enabled the LICs to discharge at the temperature as low as −40° C., which the conventional electrolyte LP30 that was 1 M LiPF$_6$ in EC+dimethyl carbonate (DMC) (50:50 w/w %) could not achieve. At the low temperature of −40° C., L2 held more than 64% of the discharge capacity at 30° C., while the L1 only had the discharge capacity retention of 30%. In addition, L2 proved to achieve better cycling performance compared to L1. After 3500 cycles, the capacity retention of L2 was 96%; while L1 just had the capacity retention of 88%. After 10,000 cycles, the capacity retention of L1 and L2 were about 86.6% and 84.7%, which demonstrated the stable cycling performance for electrolyte L1 and L2. In summary, L2 was the most suitable electrolyte for the LICs energy storage devices which would be applied in the temperature range as low as −40° C.

With respect to the above description then, it is to be realized that the optimum dimensional relationships for the parts of the invention, to include variations in chemical formulations, chemistry, reactional functioning, materials, shape, form, function and manner of operation, process, method of assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE PREFERRED EMBODIMENTS

Experimental

Figure 1:
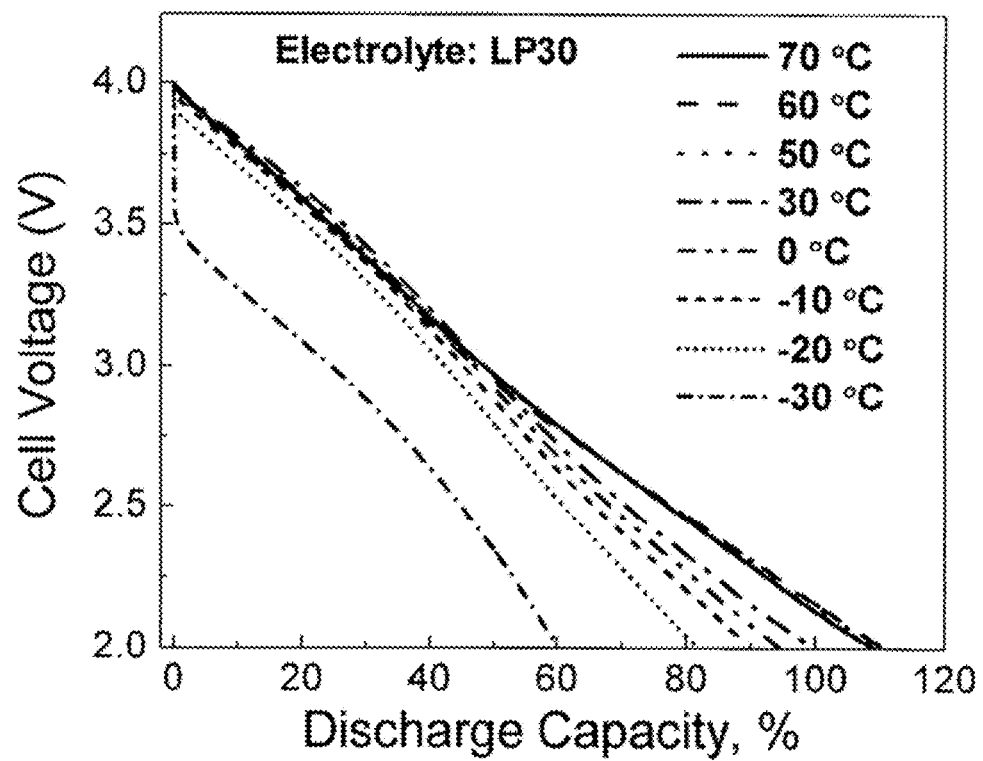
FIGS. 1A, 1B and 1C depict a graphical representation of the discharge voltage profiles of the LIC cells with electrolyte (a) LP30, (b) L1 and (c) L2 at various temperatures from 70° C. to −40° C.

Commercial active materials were used as received for both the positive and negative electrodes. The positive electrode (PE) was prepared by coating a slurry mixture of activated carbon (AC, YP-50F, Kuraray Chemical Co; Japan) and polytetrafluoroethylene (PTFE) as the binder by the mass ratio of 94:6 on an Al foil substrate (Exopack™, 20 μm in thickness). The slurry mixture of the negative electrode (NE) was composed of hard carbon (HC, Carbotron P(J). Kureha Japan) and PTFE as a binder by the mass ratio of 96:4. After the slurry was prepared, it was coated onto a Cu foil substrate that had a thickness of 14 μm. Then the electrodes were dried at 160° C. for 12 hours in an oven with constant flowing air. After the electrodes were dried, the AC and HC electrode sheets were calendared by heated-rolling mill to compress them to the desired thickness of 100 μm for AC and 80 μm for HC, which is only the thickness of the coated active material. All the electrode sheets were kept in a dry room environment (Dew Point −45° C.) and punched out into 1.27 $cm^2$ (active area) round disks.

All the punched electrodes were additionally dried at 160° C. overnight in a vacuum oven. After drying, the HC anode electrodes were surface treated with SLMP followed by pressing with a rolling mill in the dry room before being assembled into LIC test coin cells. SLMP is Li metal powder with a passivation layer on its surface with an average particle size of ~40 μm. Three types of electrolyte formulations were used to assemble the LIC coin cells. The baseline electrolyte for comparison was 1 M $LiPF_6$ in ethylene carbonate (EC)+dimethyl carbonate (DMC) at a ratio of 1:1 by weight (LP30, SelectiLyte™, Merck Electrolyte). The electrolyte L1 was 1M $LiPF_6$ in EC+ethyl methyl carbonate (EMC)+methyl butyrate (MB) (20:20:60 v/v %)+0.1M lithium bis(oxalato)borate (LiBOB) and the electrolyte L2 was 1M $LiPF_6$ in EC+EMC+MB (20:20:60 v/v %)+0.1M lithium difluoro(oxalato)borate (LiDFOB). The separator used in the cells was cellulose based TF40-30 (NKK Nippon Kodoshi Corp., Japan).

Three types of LIC test cells (coin cells CR2032) LIC-LP30, LIC-L1 and LIC-L2 were assembled in the glove be (<1 ppm oxygen and moisture) and LIC-X meant that the electrolyte of the LIC test cell was X. First, all the LIC cells were charged-discharged under various temperatures from 70° C. to −40° C. to study the discharge capacity retention under different temperatures. All the cells were rested in the environmental chamber until the temperature was stable and not changing at the desired temperature and then charged to 4 V under a constant current of 0.5 mA. After they reached 4 V, all the LIC cells were held at 4 V for constant voltage charging for 10 minutes.

Then the LIC cells were discharged to 2 V under a constant current of 1 mA to obtain the discharge capacity. Secondly, the cell LIC-L2 was discharged at −40° C. under various current from 0.5 mA to 3 mA while charged at the same current of 0.5 mA to obtain the rate performance of the electrolyte L2 at temperature as low as −40° C. Finally, all the LIC cells were charged and discharged under a constant current of 10 mA for long cycling performance at 30° C. between 2.2 V and 3.8 V, which make sure that the cutoff voltages are in the windows for stable long cycle life. An Arbin BT-2000 Battery Testing Unit was used for performance test and the electrochemical impedance spectrum (EIS) of all the LIC cells was recorded under various temperatures from 70° C. to −40° C. in the frequency range of 0.01-10$^6$ Hz with an amplitude of 10 mV using Gamry Instruments Reference 3000 Potentiostat/Galvanostat/ZRA.

Results and Discussion

Figure 1B:
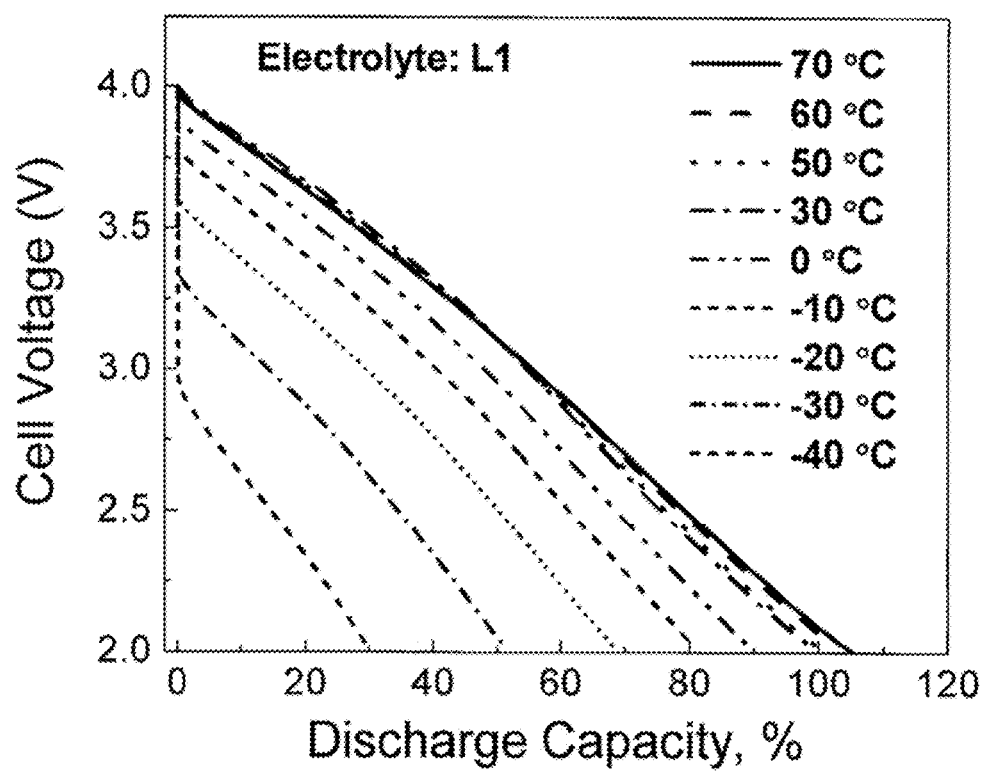
Figure 1C:
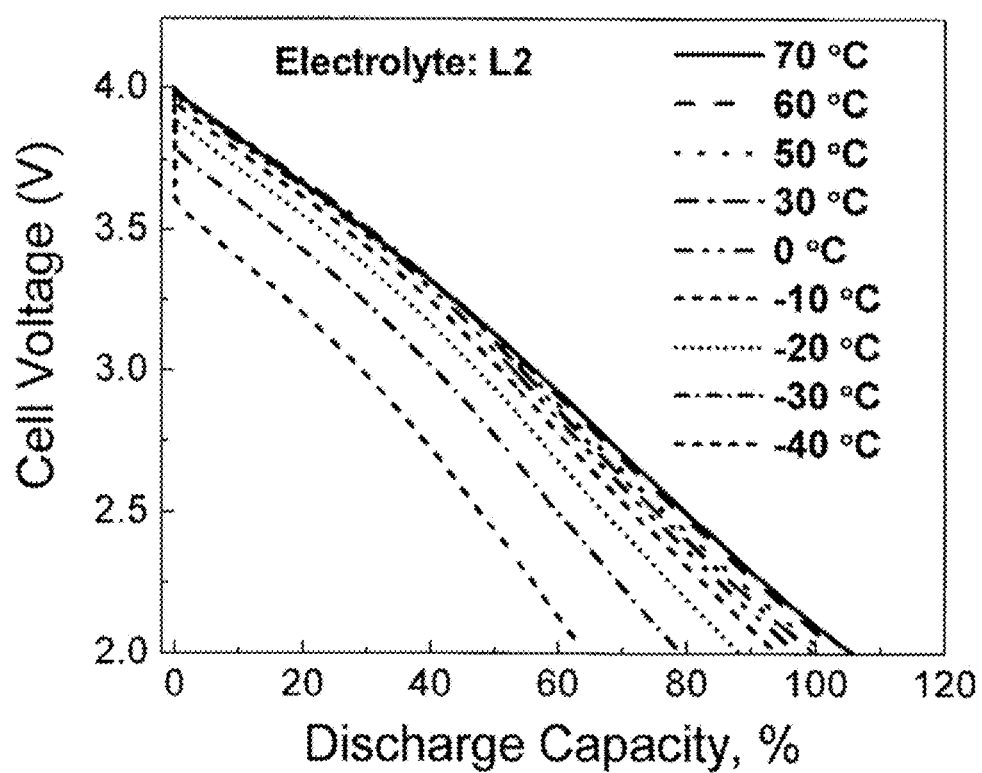

FIGS. 1A, 1B and 1C depict a graphical representation of the discharge voltage profiles of the LIC cells with electrolyte (a) LP30, (b) L1 and (c) L2 at various temperatures from 70° C. to −40° C.

In order to study and compare the temperature performance of the three types of electrolyte, all the LIC cells were charged and discharged under temperatures from 70° C. to −40° C. Referring now to FIGS. 1A, 1B and 1C, these illustrations depict a graphical representation showing the discharge voltage profiles of the LIC cells under various temperatures. The discharge curves all similarly show characteristics of both EDLCs and LIBs and the sloping discharge profiles which are linear voltage decline over time are similar to those of the EDLCs. It can be seen from FIG. 1A that the prior art LIC-LP30 has the discharge capacity retention of 110% at high temperatures from 50° C. to 70° C. and the capacity retention is about 60.2% when LIC-LP30 was discharged at −30° C. For LIC-LP30, the cell could not be charged and discharged at −40° C.

From an inspection of FIGS. 1B and 1C, it can be observed that both LIC-L1 and LIC-L2 can be discharged at temperature as low as −40° C. The LIC-L1 and LIC-L2 discharged at −40° C. deliver 30.3% and 64.4% of the capacity that they deliver at 30° C., which the LIC-LP30 is not able to achieve. At the same time, both LIC-L1 and LIC-L2 have capacity retentions of about 105% at the temperature as high as 70° C., which demonstrate that the electrolyte L1 and L2 are capable to operate in a wide temperature range for LICs. Increasing the temperature to 70° C. results in a slight improvement of the LIC cell performance; however, lowering the operating temperature below 30° C. results in significant degradation of LIC performance, which is consistent with the behavior of the LIBs and contrary to that observed with the EDLCs containing ACN[25].

Figure 2:
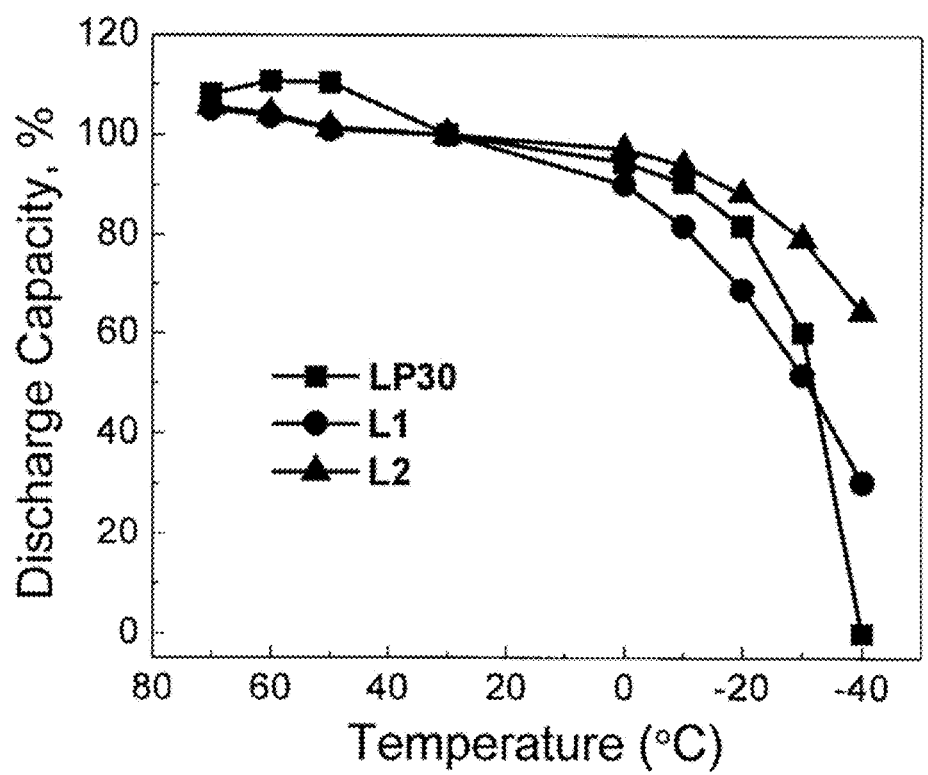
FIG. 2 depicts a graphical representation of the discharge capacity percentage based on the value at 30° C. as a function of operating temperature from 70° C. to −40° C. for all the LIC cells.

FIG. 2 depicts a graphical representation of the discharge capacity percentage based on the value at 30° C. as a function of operating temperature from 70° C. to −40° C. for all the LIC cells.

FIG. 2 displays the summary of all the LIC cell performance under various temperatures and it can be concluded that L2 proves to be the best low temperature electrolyte for LICs. At high temperatures from 50° C. to 70° C., the L2 also shows comparable discharge capacity retention to LP30, which concludes that L2 is suitable to LICs with the temperature range of 70° C. to −40° C.

Figure 3:
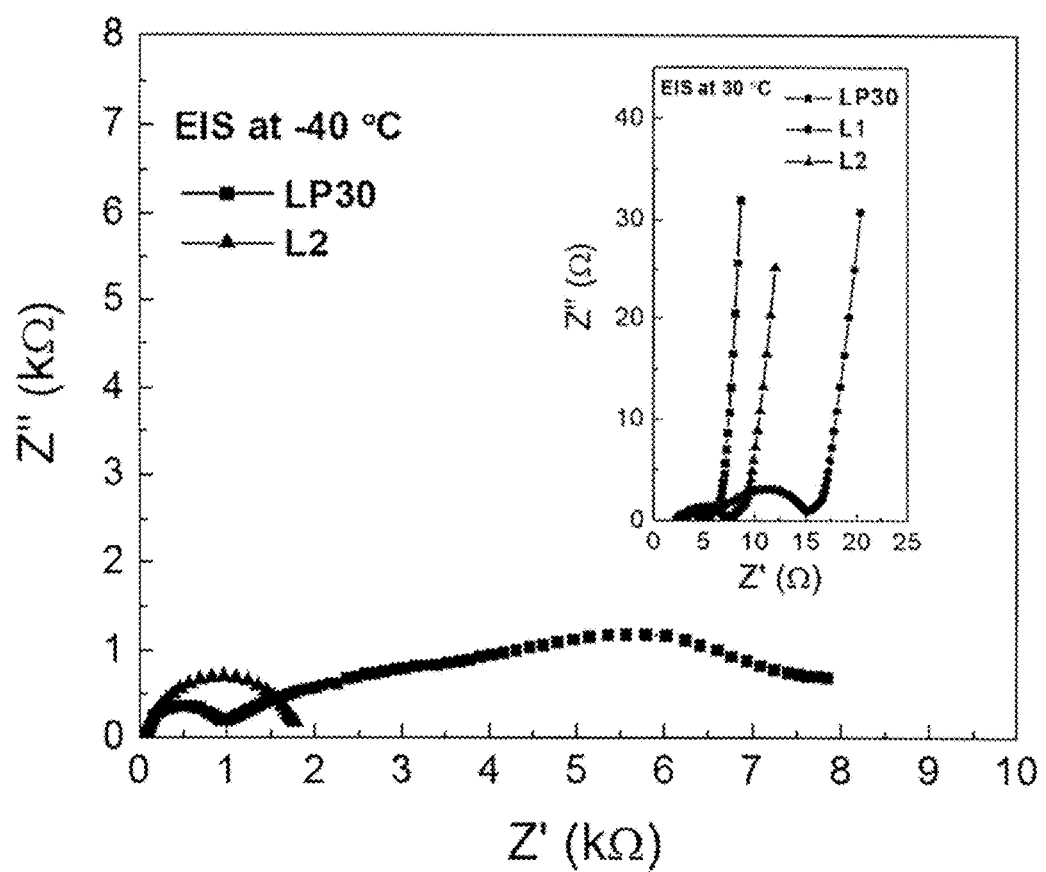
FIG. 3 depicts a graphical representation of the EIS of the LIC cells at −40° C. and 30° C.

FIG. 3 depicts a graphical representation of the EIS of the LIC cells at −40° C. and 30° C.

To gain a better understanding the differences between all three types of electrolyte formulations. EIS was used to obtain the ohmic resistance of the LIC cells at various temperatures before cycling. The EIS curves of the LIC cells are displayed in FIG. 3. At the temperature of 30° C., the $ESR_{AC}$ of the LIC-LP30, L1 and L2 are 2.2Ω, 3.1Ω and 2.7Ω, which means that the conductivity of LP30 has the highest value compared to L1 and L2. However, at −40° C., there is a huge difference between LP30 and L2. The resistance of L2 is much smaller than LP30 at −40° C., which explains the reason for the good performance of L2 at the temperature as low as −40° C.

Figure 4A:
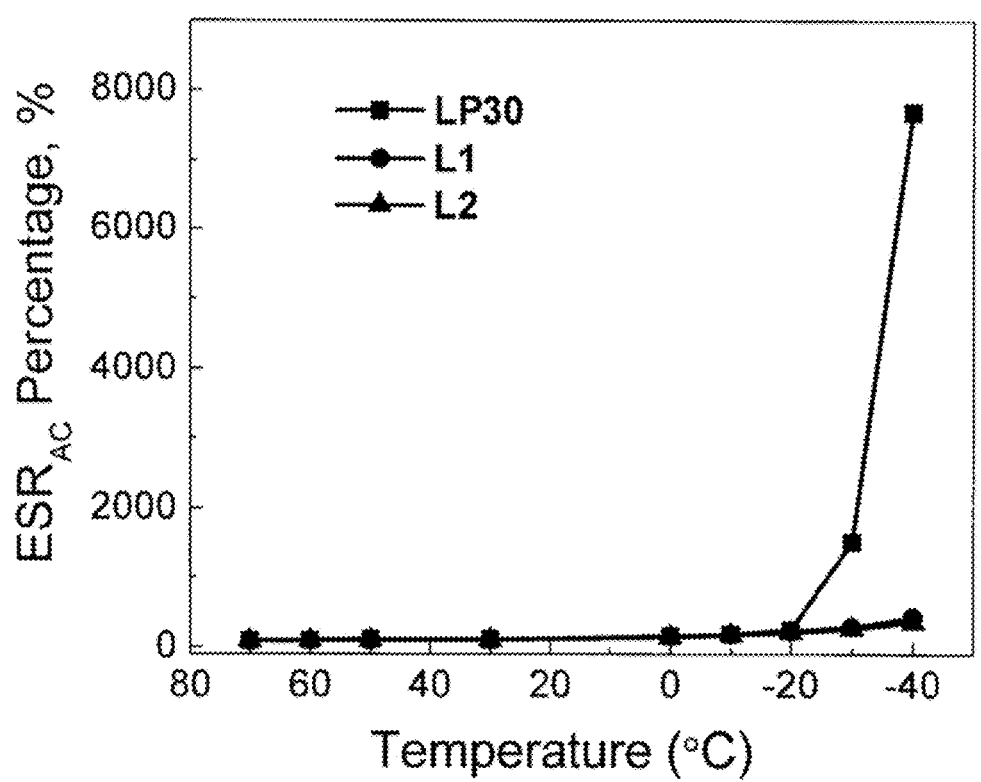
FIGS. 4A and 4B depict a graphical representation of the $ESR_{AC}$ percentage based on the value at 30° C. as a function of operating temperature from 70° C. to −40° C. for all the LIC cells.
Figure 4B:
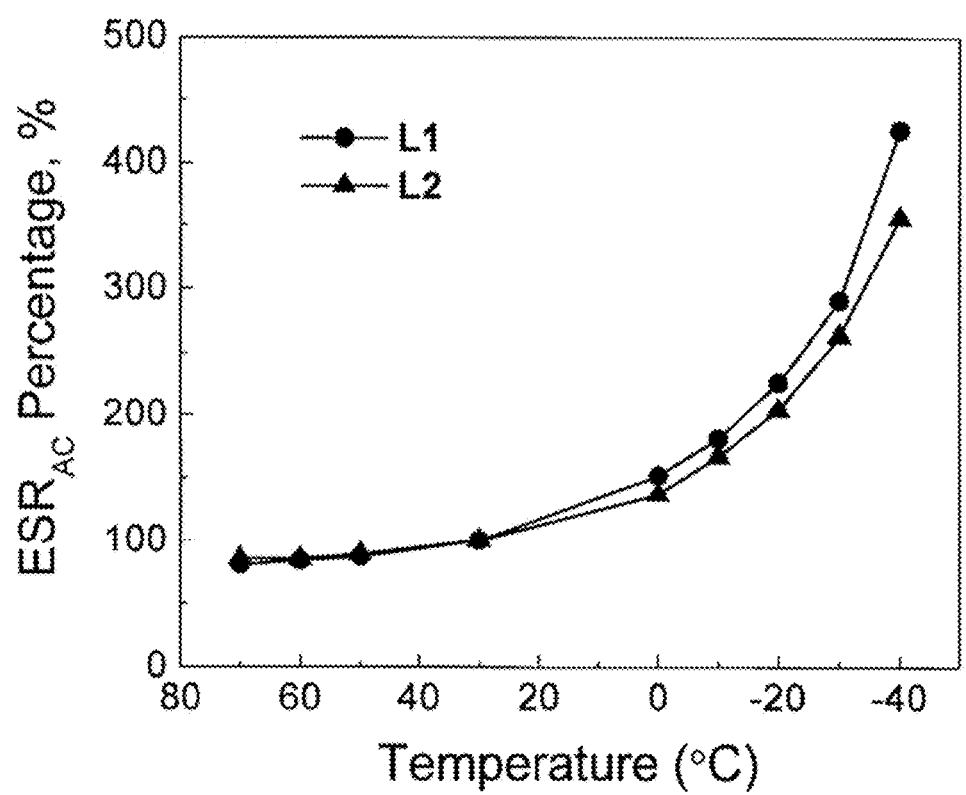

FIGS. 4A and 4B depict a graphical representation of the $ESR_{AC}$ percentage based on the value at 30° C. as a function of operating temperature from 70° C. to −40° C. for all the LIC cells.

The $ESR_{AC}$ percentage based on the value at 30° C. as a function of various operating temperatures for all LIC cells is shown in FIG. 4A. The $ESR_{AC}$ is found at the high-frequency real-axis intercept of the impedance curve. It is obvious that the $ESR_{AC}$ percentages of LIC-LP30 at −30° C. and −40° C. have much larger values than those of LIC-L1 and LIC-L2, which illustrates that the conductivities of LP30 at −30° C. and −40° C. are much smaller than those of L1 and L2. FIG. 4B is the comparison of the $ESR_{AC}$ at various temperatures between LIC-L1 and LIC-L2. Compared to L1, L2 shows analogous values of the $ESR_{AC}$ percentages at temperatures from 70° C. to 30° C. but smaller values from 30° C. to −40° C. Therefore, the conductivity of L2 at low temperature is higher than that of L1.

Figure 5:
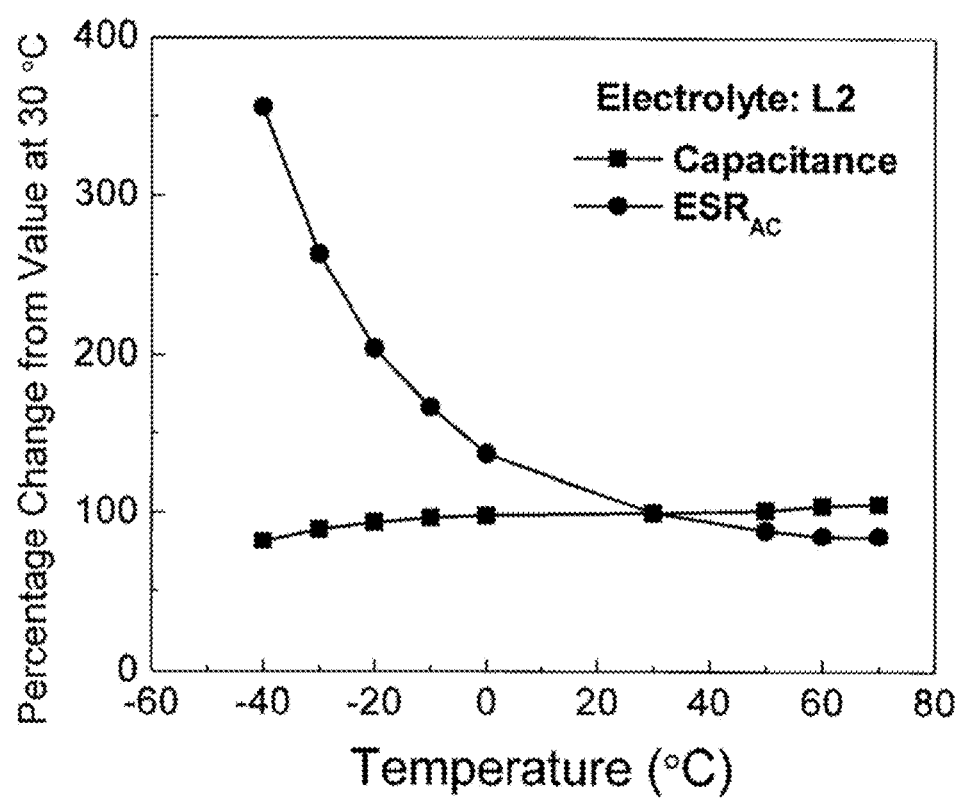
FIG. 5 depicts a graphical representation of the discharge capacitance and $ESR_{AC}$ percentage based on the value at 30° C. as a function of the operating temperature for LIC-L2.

FIG. 5 depicts a graphical representation of the discharge capacitance and $ESR_{AC}$ percentage based on the value at 30° C. as a function of the operating temperature for LIC-L2.

FIG. 5 displays the capacitance and $ESR_{AC}$ of the LIC-L2 under various temperatures. The calculation method for the capacitance is based on MAXWELL method[43]. It can be found that electrolyte L2 enables the LIC to achieve stable capacitance in a wide temperature range from 70° C. to −40° C. At −40° C., the capacitance and $ESR_{AC}$ have 81.8% and 355.6% of the values that they achieve at 30° C., respectively.

Figure 6:
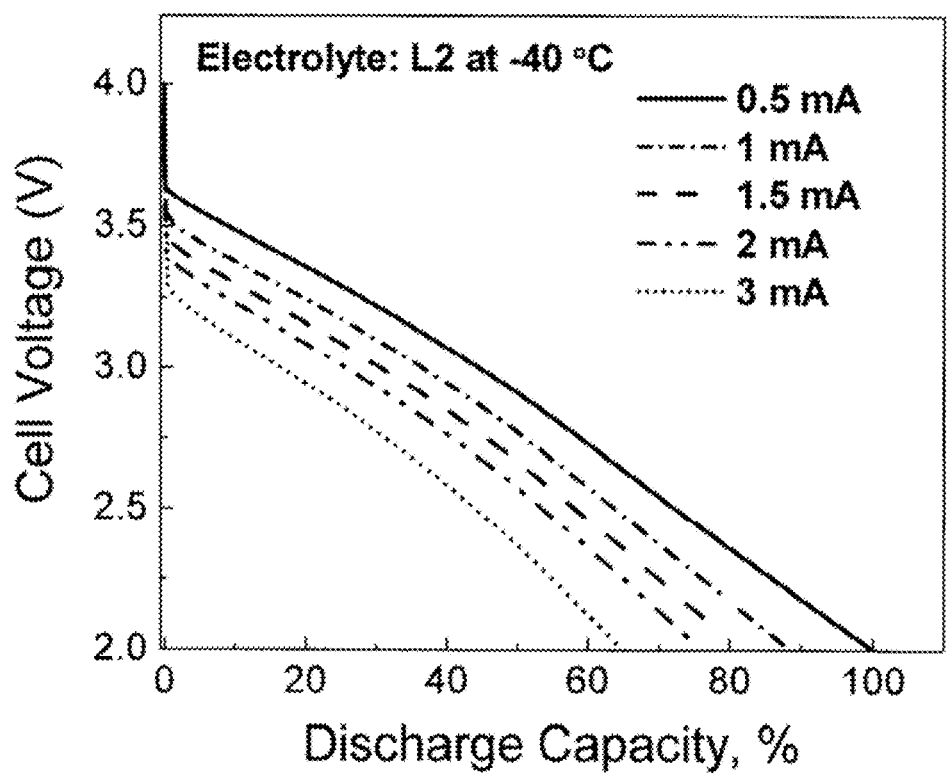
FIG. 6 depicts a graphical representation of the Discharge voltage profiles of the LIC-L2 under various currents from 0.5 to 3 mA at the temperature of −40° C.

FIG. 6 depicts a graphical representation of the Discharge voltage profiles of the LIC-L2 under various currents from 0.5 to 3 mA at the temperature of −40° C.

Since L2 is the most suitable electrolyte to LIC with a wide temperature range, the rate performance at −40° C. and the cycling performance at 30° C. were analyzed and compared. FIG. 6 presents the discharge voltage profiles of the LIC-L2 under various currents from 0.5 to 3 mA at the temperature of −40° C. When the discharge current is 3 mA, the LIC-L2 still delivers 64.2% of the discharge capacity that it delivers under the current of 0.5 mA, which proves that LIC-L2 achieves excellent rate performance even at −40° C.

Figure 7A:
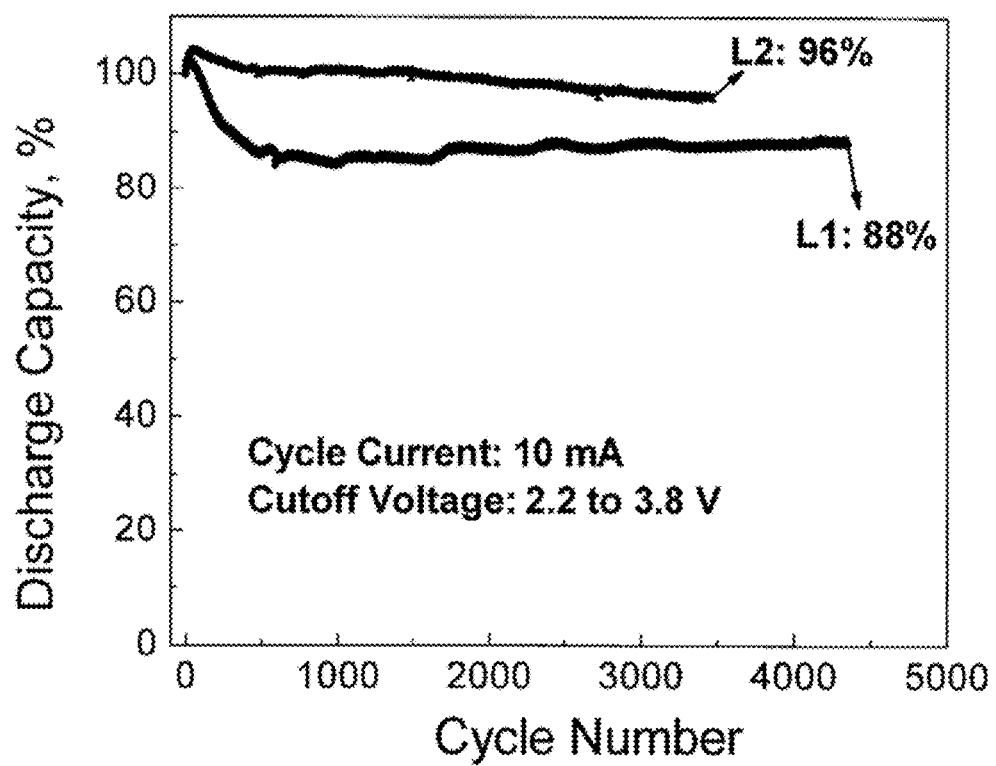
FIGS. 7A and 7B depict a graphical representation of the discharge capacity percentage as a function of the cycle number for LIC-L1 and LIC-L2 (FIG. 7A), and the discharge capacity percentage and efficiency as a function of the cycle number for LIC-L2 (FIG. 7B).
Figure 7B:
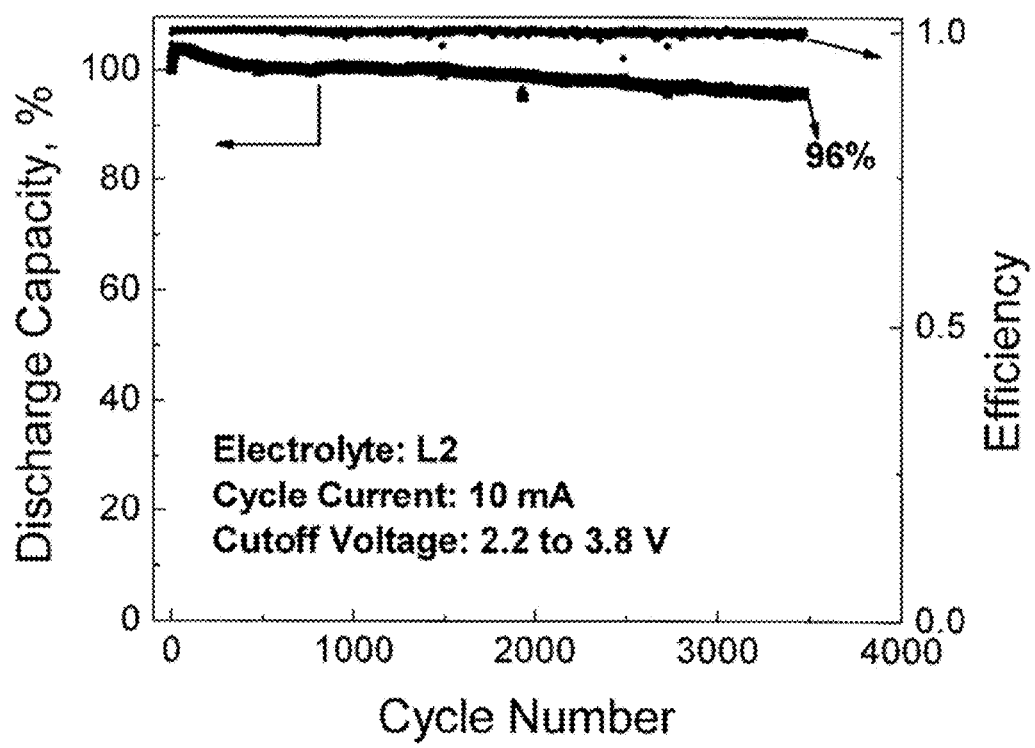

FIGS. 7A and 7B depict a graphical representation of the discharge capacity percentage as a function of the cycle number for LIC-L1 and LIC-L2 (see FIG. 7A), and the discharge capacity percentage and efficiency as a function of the cycle number for LIC-L2 (see FIG. 7B).

FIG. 7A displays the cycling performance for LIC-L1 and LIC-L2 under a charge-discharge current of 10 mA. It can be seen from FIG. 7A that after 3500 cycles, the LIC-L2 still maintained more than 96% of the initial discharge capacity, which demonstrated the long cycling stability of the LIC with L2 electrolyte. However, the capacity retention of LIC-L1 is about 88% after 4300 cycles and the capacity retention values are smaller than those of LIC-L2 under all the cycle numbers.

The round-trip efficiency of LIC-L2 is close to 100% for all the cycles as shown in FIG. 7B, which also demonstrates the long cycle stability for LIC cells with L2 as the electrolyte. However, when both LIC-L1 and LIC-L2 are charged-discharged over 10,000 cycles, the capacity retentions are very similar which are both about 85% as presented in FIG. 8.

Figure 8:
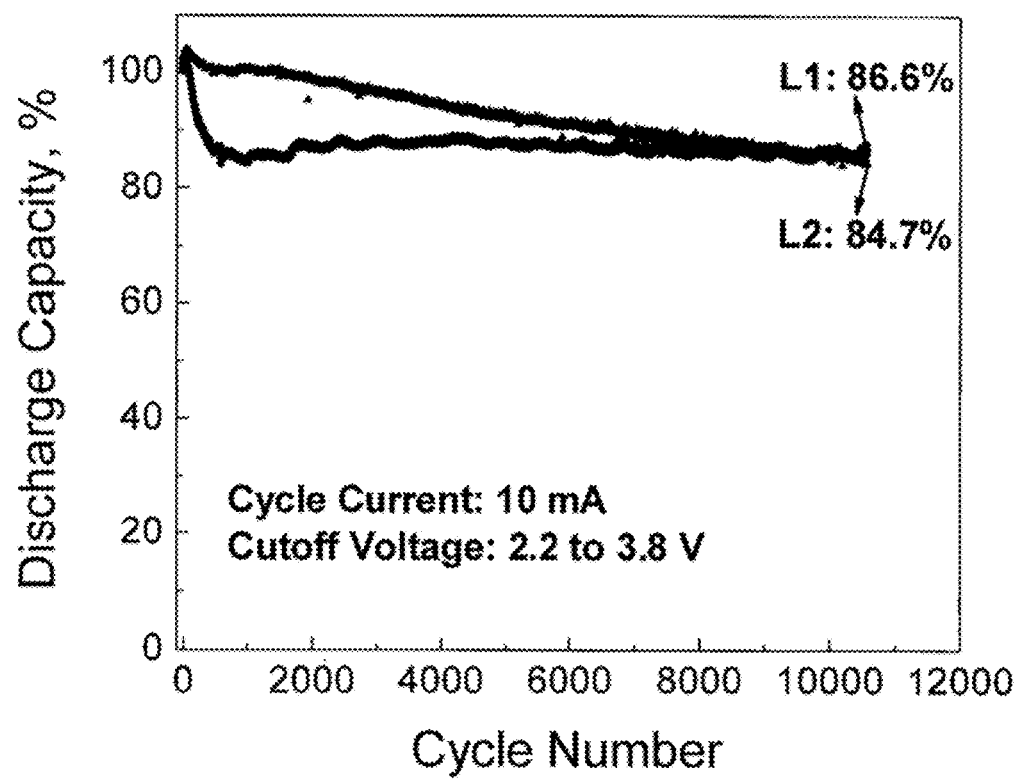
FIG. 8 depicts a graphical representation of the discharge capacity retention as a function of the cycle number for LIC-L1 and LIC-L2.

FIG. 8 depicts a graphical representation of the discharge capacity retention as a function of the cycle number for LIC-L1 and LIC-L2.

It can been figured out from FIG. 8 that LIC-L1 decays dramatically in the first 1,000 cycles and then it becomes stable in the discharge capacity in the following 9,000 cycles white LIC-L2's capacity retention decays linearly during all the cycles so that after 10,000 cycles the LIC-L2 shows smaller value of the capacity retention than LIC-L1.

The electrolyte LP30 has been proved to enable the LICs with 100,000 cycles[36] by the research report from our group. Therefore, the future work should be comparing the L2 to LP30 with longer cycling performance and figuring out whether the L2 can be applied in LIC with more than 100,000 cycles.

The LIC laminate cells utilizing the electrolytes of the present invention include positive electrodes, negative electrodes with lithium sources including lithium powder called SLMP or thin lithium films applied on surface, and an organic electrolyte solution with lithium salt that are housed in a container, for example a metal can container or a laminated outer container.

Figure 9:
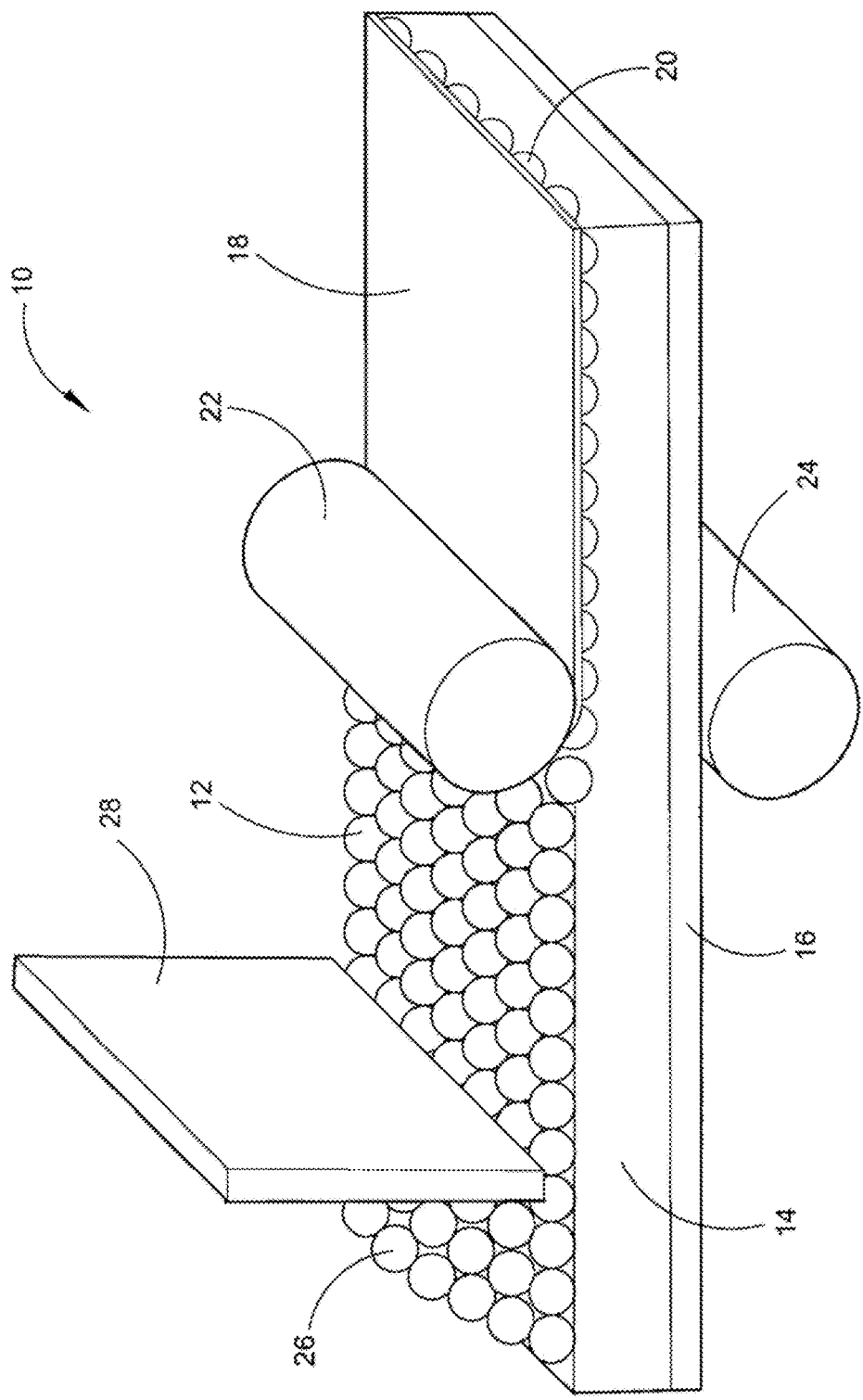
FIG. 9 is representational view of the mechanical aspects of the coating process of stabilized lithium metal powder (SLMP) on the surface of a negative electrode.

There is seen in FIG. 9 a representational view of the mechanical aspects of the coating process 10 of stabilized lithium metal powder (SLMP) on the surface of a negative electrode. The coating process starts with adding a layer of SLMP later 12 to a hard carbon surface 14 which is placed on a copper foil/plate 16. A blade 28 then passes over the SLAW layer 12, removing excess SLMP 26, before rollers, comprising upper roller 22 and lower roller 24 act to substantially flatten out the SLMP layer 12 to create essentially a flat upper SLMP surface 18 and a lower SLMP surface 20.

The LIC laminate cell of the present invention generally has a cell core unit formed by stacking positive electrodes and negative electrodes through separators in an outer container, for example a laminated outer container. The negative electrodes are pre-doped by pressing the lithium sources including the SLMP or thin Li films on the surface of the negative electrodes as shown in FIG. 9 to FIG. 14. The "pre-dope" roughly represents a phenomenon in which the lithium ions enter into the negative, electrode active material. The lithium powder SLMP or thin films are the lithium on supply source to pre-dope the negative electrodes. The lithium source loading process can make sure that the negative electrodes contain uniform lithium on the surface so that when the electrolyte is filled, the negative electrodes can be smoothly and uniformly pre-doped with lithium ions. FIG. 10 to FIG. 14 are described in more detail below.

Figure 10:
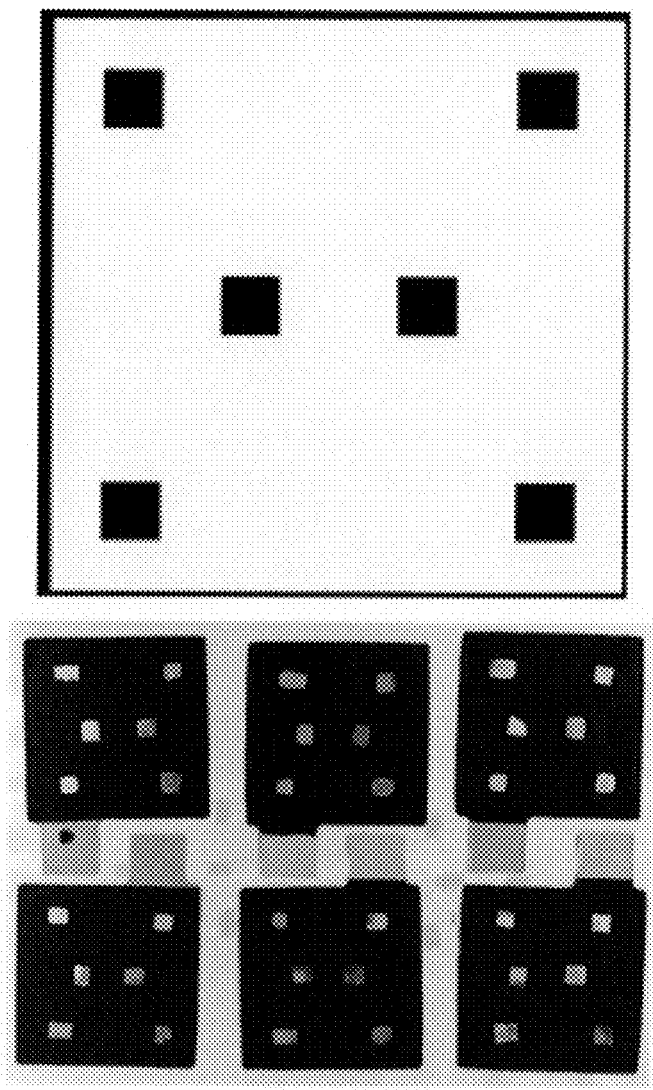
FIG. 10 depicts a 3% 4% Li film mass loafing percentage with 120 μm to 140 μm square Li films.

FIG. 10 depicts a 3% 4% Li film mass loading percentage with 120 μm to 0.140 μm square Li films.

Figure 11:
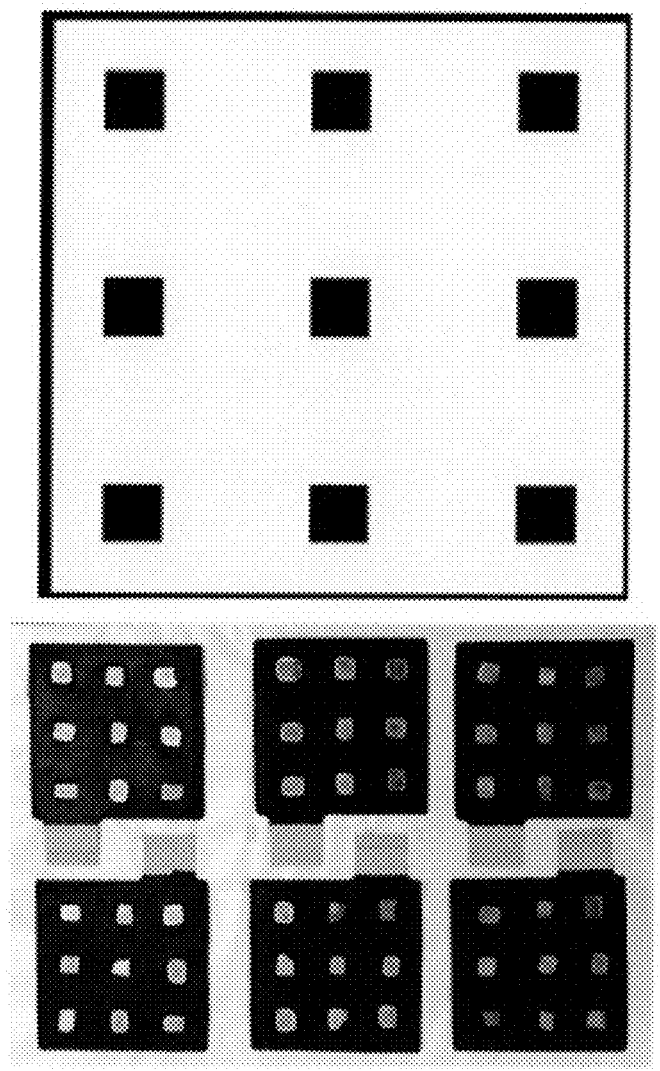
FIG. 11 depicts a 5% Li film mass loading percentage with 120 μm to 140 μm square Li films.

FIG. 11 depicts a 5% Li film mass loading percentage with 120 μm to 140 μm square Li films.

Figure 12:
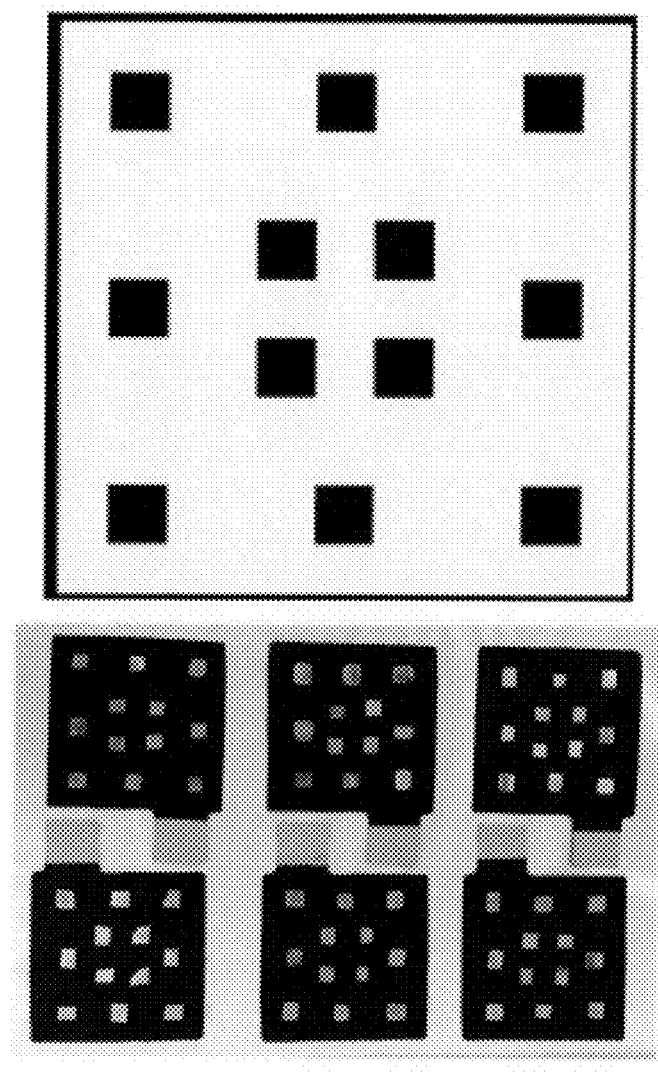
FIG. 12 depicts a 7% Li film mass loading percentage with 120 μm to 140 μm square Li films.

FIG. 12 depicts a 7% Li film mass loading percentage with 120 μm to 140 μm square Li films.

Figure 13:
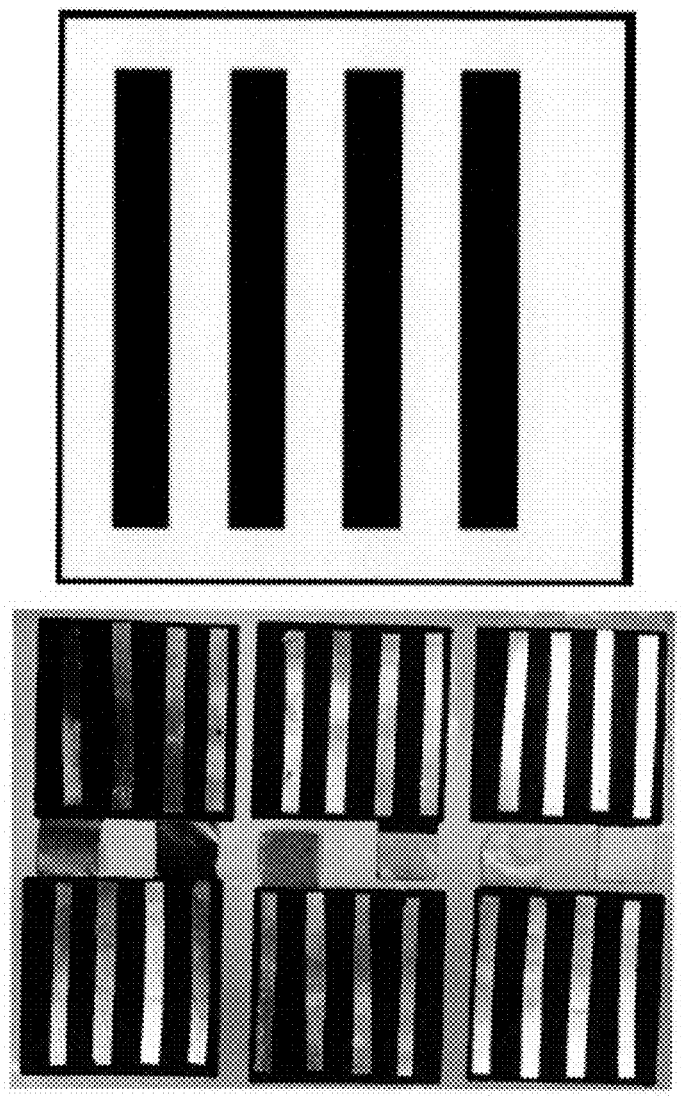
FIG. 13 depicts an 8%-10% Li film mass loading percentage with 45×4×0.045 mm Li strips.

FIG. 13 depicts an 8%-10% Li film mass loading percentage with 45×4×0.045 mm Li strips.

Figure 14:
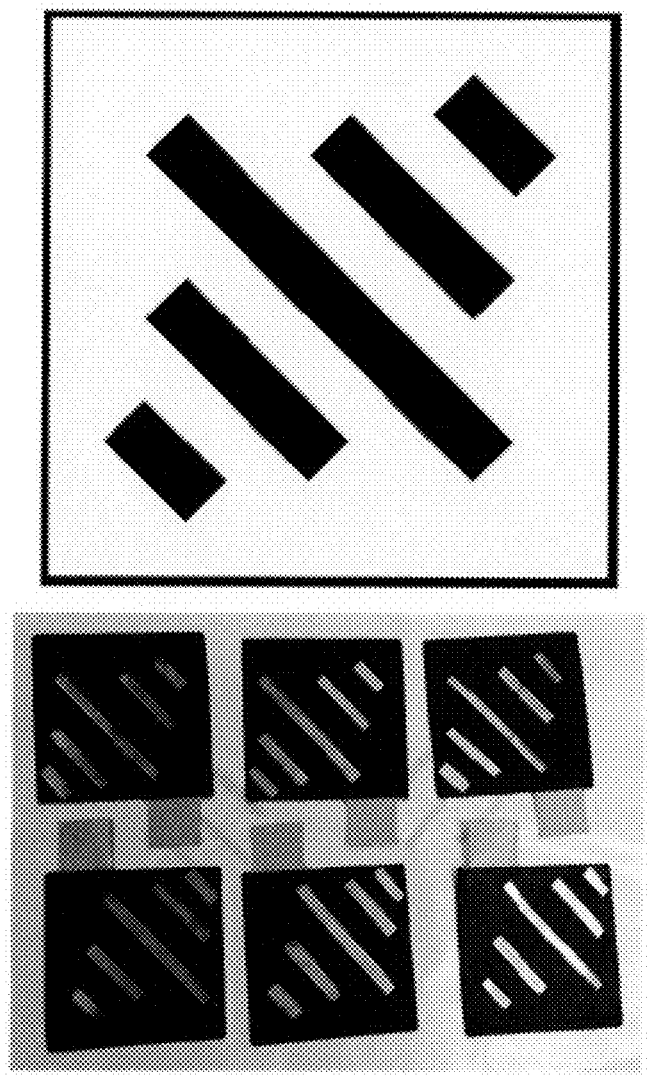
FIG. 14 depicts a 10% Li film mass loading percentage with 3 mm-4 mm width, 0.045 mm thickness and various length Li strips.

FIG. 14 depicts a 10% Li film mass loading percentage with amt 3 mm-4 mm width, 0.045 mm thickness and various length Li strips.

SUMMARY AND CONCLUSION

High performance Lithium-ion capacitors (LICs) with the operating temperature range from 70° C. to −40° C. were achieved by applying the electrolyte with formulations that contain methyl butyrate (MB) as the solvent and lithium bis(oxalato)borate (LiBOB) and lithium difluoro(oxalato) borate (LiDFOB) as the additives. Two types of the electrolyte formulations L1 (1.0 M LiPF6 in EC/EMC/MB (20:20:60, v/v %)+0.1 M LiBOB) and L2 (1.0 M LiPF6 in EC/EMC/MB (20:20:60, v/v %)+0.1 M LiDFOB) were studied and compared to the conventional electrolyte LP30 that was used in LICs.

At the low temperature of −40° C., the discharge capacity retentions of L1 and L2 were 64% and 30% based on the values at 30° C., while LIC with LP30 could not charge and discharge. L1 and L2 also proved to be able to achieve long cycling performance LICs. After 10,000 cycles, the capacity retentions of L1 and L2 were 86.6% and 84.7%, which demonstrated that both L1 and L2 showed good cycling performance for 10,000 cycles for LICs. Above all, for the LICs used in temperature as low as −40° C., L2 was the best choice among all the electrolyte formulations.

The LIC laminate cell and the method of making said LIC laminate cell, shown in the drawings and described in detail herein, disclose arrangements of elements of particular construction and configuration for illustrating preferred embodiments of structure and method of operation of the present invention. It is to be understood however, that elements of different construction, chemistry and configuration and other arrangements thereof, other than those illustrated and described may be employed for providing an LIC laminate cell electrolyte, and the method of making said LIC laminate cell electrolyte, in accordance with the spirit of the invention, and such changes, alternations and modifications as would occur to those skilled in the art are considered to be within the scope of this invention as broadly defined in the appended claims.

Further, the purpose of the foregoing abstract is to enable the US Patent and Trademark Office and the public generally, and especially the scientists, engineers and practitioners in the art who are not familiar with patent or legal terms or phraseology, to quickly determine from a cursory inspection, the nature and essence of the technical disclosure of the application. The abstract is neither intended to define the invention of the application, which is measured by the claims, nor is it intended to be limiting as to the scope of the invention in any way.

APPENDIX TO PATENT APPLICATION

References Cited Within this Patent Application

1. H. Shi, Electrochim. Acta, 41, 1633 (1996).
2. H. Nakamura and M. Okamura, in Proceedings of The 13th International Seminar on Double Layer Capacitors, Florida Educational Seminars Inc. (2003).
3. V. L. Pushparaj, M. M. Shaijumon, A. Kumar, S. Murugesan, L. Ci, R. Vajtai, R. J. Linhardt, O. Nalamasu, and P. M. Ajayan, PNAS, 4, 13574 (2007).
4. J. Chmiola, G. Yushin, Y. Gogotsi, C. Portet, P. Simon, and P. L. Taberna, Science, 313, 1760 (2006).
5. J. P. Zheng, J. Huang, and T. R. Jow, J. Electrochem. Soc., 144, 2026 (1997).
6. J. P. Zheng and T. R Jow. J. Electrochem. Soc., 144, 2417 (1997).
7. J. P. Zheng, J. Electrochem. Soc. 150, A484 (2003).
8. J. P. Zheng, J. Electrochem. Soc. 152, A1864 (2005).
9. J. P. Zheng, J. *Electrochem. Soc.,* 156, A500 (2009).
10. G. G. Amatucci, F. Badway, A. DuPasquier, and T. Zheng, *J. Electrochem. Soc.,* 148, (2001) A930.
11. G. G. Amatucci, F. Badway, J. Shelburne, A. Gozdz, I. Plitz, A. DuPasquier, and S. G. Menocal, in *Proceedings of The* 11*th International Seminar on Double Layer Capacitors,* (2001) Florida Educational Seminars Inc.

12. S. Tasaki, N. Ando, M. Nagai, A. Shirakami, N. Matsui, and Y. Hato, U.S. Pat. No. 7,733,629 B2, 2010.
13. H. Konno, T. Kasashima, and K. Azumi, J. Power Sources, 191, (2009) 623.
14. M. Schroeder, M. Winter, S. Passerini, and A. Balducci, J. Electrochem. Soc., 159, (2012) A1240.
15. N. Böckenfeld, P. Kühnel, S. Passerini, M. Winter, and A. Balducci, J. Power Sources, 196, (2011) 4136.
16. A. Krause, P. Kossyrev, M. Oljaca, S. Passerini, M. Winter, and A. Balducci, J. Power Sources, 196, (2011) 8836.
17. T. Aida, I. Murayama, K. Yamada, and M. Morita, Electrochem. Solid-State Lett., 10 (2007) A93.
18. T. Aida, I. Murayama, K. Yamada, and M. Morita, J. Electrochem. Soc., 154, (2007) A798.
19. H. Wang, and M. Yoshio, J. Power Sources, 195, (2010) 389.
20. J. Kim, J. Kim, Y. Lim, J. Lee, and Y. Kim, J. Power Sources, 196, (2011) 10490.
21. S. R. Sivakkumar, A. S. Milev, and A. G. Pandolfo, Electrochim, Acta, 56, (2011) 9700.
22. S. R. Sivakkumar, and A. G. Pandolfo, Electrochim. Acta, 65, (2012) 280.
23. A. Brandt, and A. Balducci, Electrochim. Acta, 108, (2013) 219.
24. M. Schroeder, M. Winter, S. Passerini, and A. Balducci, J. Power Sources, 238, (2013) 388.
25. P. H. Smith, T. N. Tran, T. L. Jiang, and J. Chung, J. Power Sources, 243, (2013) 982.
26. F. Xu, C. H. Lee, C. M. Koo, and C. Jung, Electrochim. Acta, 115, (2014) 234.
27. J. Zhang, Z. Shi, and C. Wang, Electrochim. Acta, 125, (2014) 22.
28. D. Puthusseri, V. Aravindan, S. Madhavi and S. Ogale, Electrochim. Acta, 130, (2014) 766-770.
29. J. J. Ren, L. W. Su, X. Qin, M. Yang, J. P. Wei, Z. Zhou and P. W. Shen, J. Power Sources, 264, (2014) 108-113.
30. M. Schroeder, S. Menne, J. Segalini, D. Saurel, M. Casas-Cabanas, S. Passerini, M. Winter and A. Balducci, J. Power Sources, 266, (2014) 250-258.
31. J. P. Zheng and W. J. Cao, The 20th International Seminar on Double Layer Capacitors and Similar Energy Storage Devices, Florida Educational Seminars Inc. (2010).
32. W. J. Cao, J. P. Zheng, J. Power Sources, 213, (2012) 180.
33. W. J. Cao and J. P. Zheng, J. Electrochem. Soc. 160, (2013) A1572.
34. W. J. Cao, J. Shih, J. P. Zheng, T. Doung, J. Power Sources, 257, (2014) 388-393.
35. W. J. Cao, Y. X. Li, B. Fitch, J. Shih, J. P. Zheng. J. Power Sources, 268, (2014) 841-847.
36. W. J. Cao, J. S. Zheng, D. Adams, T. Doung and J. P. Zheng, J. Electrochem. Soc., 161(14), (2014) A2087-A2092.
37. S. S Zhang, K. Xu, T. R. Jow, J. Power Sources, 156, (2006) 629-633.
38. S. S. Zhang, Electrochem. Commun. 8, (2006) 1423-1428.
39. S. S. Zhang, J. Power Sources, 163, (2007) 713-718.
40. M. C. Smart, B. L. Lucht, S. Dalavi, F. C. Krause, and B. V. Ratnakumar, J. Electrochem. Soc. 159(6), (2012) A739-A751.
41. M. C. Smart, C. Hwang, F. C. Krause, J. Soler, W. C. West, B. V. Ratnakumar, and K. Amine, ECS Trans., 50(26), (2013) 355-364.
42. F. C. Krause, C. Hwang, B. V. Ratnakumar, M. C. Smart, D. W. McOwen, and W. A. Henderson, ECS Trans., 58(48), (2014) 97-107.
43. Maxwell Technology. HP, http://www.maxwell.com/images/documents/K2Series_DS_1015370_5_20141104.pdf, accessed 30 Nov. 2014.

We claim:

1. A lithium-ion capacitor (LIC) laminate cell, comprising:
   an electrolyte including 1M LiPF6 in ethylene carbonate (EC)+ethyl methyl carbonate (EMC)+methyl butyrate (MB) in a ratio of 20:20:60 v/v %, respectively, including a 0.1M lithium based salt additive;
   a positive electrode including activated carbon (AC) as its active material;
   a negative electrode including hard carbon (HC) as its active material;
   a lithium source; and
   a separator;
   wherein the negative electrode is pre-doped with sufficient lithium ions by placing lithium sources on the surface of negative electrodes, and wherein the 0.1M lithium based salt additive is lithium bis(oxalato)borate (LiBOB) or lithium difluoro(oxalato)borate (LiDFOB);
   and further wherein the cell operating voltage range is from 3.8 V to 2.2 V, and further wherein the resulting LIC cell is capable of high performance functioning in a wide temperature range down to −40 C.

2. The LIC laminate cell according to claim 1, wherein said lithium source loaded on the surface of negative electrodes include stabilized lithium metal powder (SLMP).

3. The LIC laminate cell according to claim 1, wherein said lithium source loaded on the surface of negative electrodes include square-shaped lithium film pieces.

4. The LIC laminate cell according to claim 1, wherein said lithium source loaded on the surface of negative electrodes include round-shaped lithium film pieces.

5. The LIC laminate cell according to claim 1, wherein said lithium source loaded on the surface of negative electrodes include lithium film strips.

6. The method for making a lithium-ion capacitor (LIC) laminate cell, comprising:
   providing an electrolyte including 1M LiPF6 in ethylene carbonate (EC)+ethyl methyl carbonate (EMC)+methyl butyrate (MB) in a ratio of 20:20:60 v/v %, respectively, including a 0.1M lithium based salt additive;
   providing a positive electrode including activated carbon (AC) as its active material;
   providing a negative electrode including hard carbon (HC) as its active material;
   providing a lithium source; and
   providing a separator;
   wherein the negative electrode is pre-doped with sufficient lithium ions by placing lithium sources on the surface of negative electrodes, and wherein the 0.1M lithium based salt additive is lithium bis(oxalato)borate (LiBOB) or lithium difluoro(oxalato)borate (LiDFOB);
   and further wherein the cell operating voltage range is from 3.8 V to 2.2 V, and further wherein the resulting LIC cell is capable of high performance functioning in a wide temperature range down to −40 C.

7. The method for making an LIC laminate cell according to claim 6, wherein said lithium source loaded on the surface of negative electrodes include stabilized lithium metal powder (SLMP).

8. The method for making an LIC laminate cell according to claim 6, wherein said lithium source loaded on the surface of negative electrodes include square-shaped lithium film pieces.

9. The method for making an LIC laminate cell according to claim 6, wherein said lithium source loaded on the surface of negative electrodes include round-shaped lithium film pieces.

10. The method for making an LIC laminate cell according to claim 6, wherein said lithium source loaded on the surface of negative electrodes include lithium film strips.

* * * * *